(12) United States Patent
Bombaugh et al.

(10) Patent No.: US 8,668,150 B2
(45) Date of Patent: Mar. 11, 2014

(54) SYSTEMS, METHODS, AND APPARATUS FOR OVERHEAD SCANNING OF IMAGES IN A MANUAL DISTRIBUTION ENVIRONMENT (75) Inventors: Scott R. Bombaugh, Burke, VA (US); John M. Dunlop, Gaithersburg, MD (US)

(73) Assignee: United States Postal Service, Washington, DC (US)

( * ) Notice: Subject to any disclaimer, the term of this patent is extended or adjusted under 35 U.S.C. 154(b) by 35 days.

(21) Appl. No.: 13/422,876

(22) Filed: Mar. 16, 2012

(65) Prior Publication Data

US 2012/0261473 A1 Oct. 18, 2012

Related U.S. Application Data

(60) Provisional application No. 61/453,903, filed on Mar. 17, 2011.

(51) Int. Cl.
*G06K 7/10* (2006.01)
(52) U.S. Cl.
USPC ............... 235/462.32; 235/375; 235/440

(58) Field of Classification Search
USPC ........................... 235/375, 435, 440
See application file for complete search history.

(56) References Cited

U.S. PATENT DOCUMENTS

| 6,629,641 | B2 * | 10/2003 | Tsikos et al. | 235/462.01 |
| 6,864,498 | B2 * | 3/2005 | Katzir et al. | 250/559.45 |
| 8,150,163 | B2 * | 4/2012 | Kruppa | 382/190 |

* cited by examiner

*Primary Examiner* — Christle Marshall
(74) *Attorney, Agent, or Firm* — Knobbe Martens Olson & Bear LLP (57) ABSTRACT

This disclosure defines systems, methods and apparatus for scanning in a distribution environment. In one aspect a method is disclosed for expanding a field of view of a camera. The method may include moving a mirror according to a determined pattern of movement and speed and capturing a series of images with a camera while the mirror is moving such that the field of view defining images captured by the camera changes based on the position of the mirror. The method may further include using image data from the series of images to process information located on a target item being imaged. In another aspect, an apparatus is disclosed including a selectively movable mirror positioned relative to an image capture device. A controller is configured to capture an image while the mirror is moving.

30 Claims, 10 Drawing Sheets

SYSTEMS, METHODS, AND APPARATUS FOR OVERHEAD SCANNING OF IMAGES IN A MANUAL DISTRIBUTION ENVIRONMENT

CROSS REFERENCE TO RELATED APPLICATIONS

This application claims benefit under 35 U.S.C. §119(e) to U.S. Provisional Patent Application No. 61/453,903 entitled "CAMERA TO BE USED FOR OVERHEAD SCANNING OF IMAGES IN A MANUAL DISTRIBUTION ENVIRONMENT" filed on Mar. 17, 2011, the disclosure of which is hereby incorporated by reference in its entirety.

FIELD

The present application relates generally to imaging systems for scanning and processing barcodes and other information in a manual distribution environment.

BACKGROUND

Manual distribution systems employ the use of barcodes and other printed/encoded information for use in electronically scanning, sorting and managing distribution items. As items are manually sorted and processed by operators, scanning systems and techniques are employed to automatically capture and process barcodes and other machine readable information. Many methods and devices for processing barcodes are available. These may include one-dimensional barcode scanning devices, such as handheld barcode readers. Other examples of barcode scanning devices and systems include photo diode pen type readers, laser barcode scanners, charge coupled diode (CCD) scanners, and camera based barcode scanners. Improved scanning systems and techniques are desirable for allowing operators to efficiently sort and scan distribution items as they are being handled and processed in a distribution system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for capturing images. The apparatus includes an image capture device including one or more image sensors. The apparatus further includes a mirror configured to be selectively movable and positioned relative to the image capture device to reflect light toward the one or more image sensors. The apparatus further includes a controller configured to capture at least one image while the mirror is moving such that a field of view defined by the at least one image changes based on an instantaneous position of the mirror. The controller is further configured to process the at least one image to extract machine readable information located on at least a portion of one or more items in the at least one image.

Another aspect of the subject matter described in the disclosure provides an implementation of a method for capturing images. The method includes selectively moving a mirror positioned relative to the input of an image capture device. The method further includes capturing at least one image via the image capture device while the mirror is moving such that a field of view defined by the at least one image changes based on an instantaneous position of the mirror. The method further includes processing the at least one image to extract machine readable information located on at least a portion of one or more items in the at least one image.

Yet another aspect of the subject matter described in the disclosure provides an apparatus for capturing images. The apparatus includes means for reflecting light means for selectively moving the means for reflecting light. The apparatus further includes means for capturing at least one image using light reflected off the means for reflecting light while the means for reflecting light is moving such that a field of view defined by the at least one image changes based on an instantaneous position of the means for reflecting light. The apparatus further includes means for processing the at least one image to extract machine readable information located on at least a portion of one or more items in the at least one image.

Another aspect of the subject matter described in the disclosure provides an apparatus for capturing images. The apparatus includes a camera configured to capture an image defined by a first field view for a determined resolution. The apparatus further includes a mirror configured to be selectively movable and configured to be positioned at the input of the camera such that light is reflected from the mirror and into the camera. The apparatus further includes a controller configured to capture a series of images via the camera while the mirror is moving such that a second field of view defined by the series of images is larger than the first field of view.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Manual distribution systems may include scanning systems for capturing and/or processing machine readable information printed on an item being scanned. For example, the scanning systems may include capabilities for scanning barcodes and other encoded values.

Figure 1A:
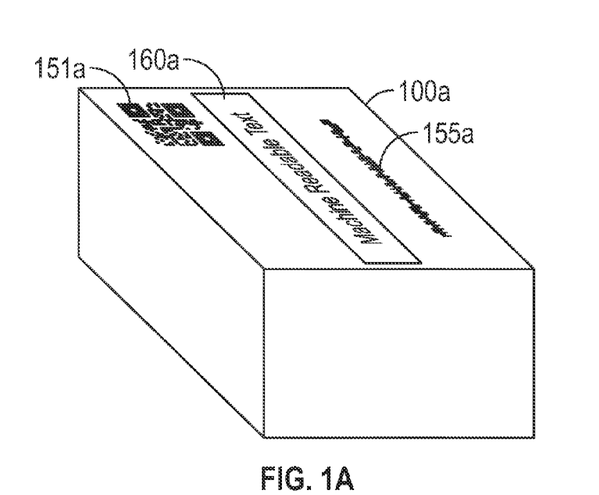
FIGS. 1A, 1B, and 1C show examples of items and information that may be processed and scanned in a manual distribution system.
Figure 1B:
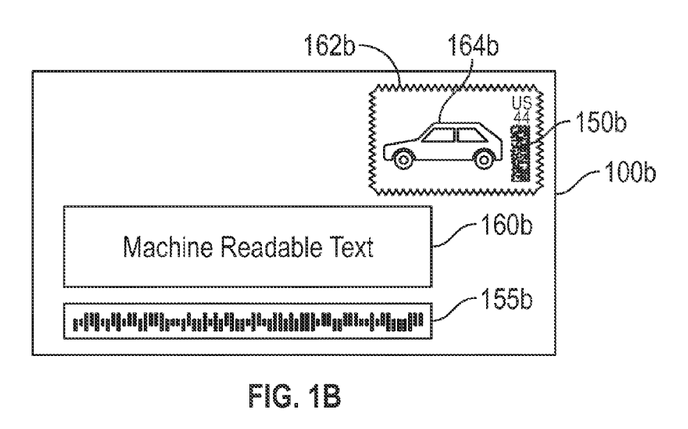
Figure 1C:
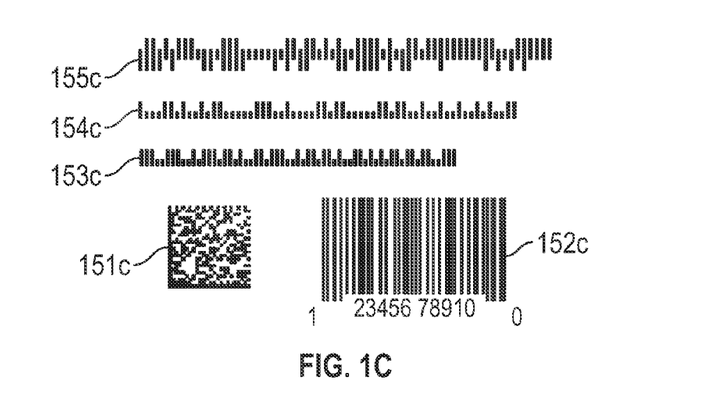

FIGS. 1A, 1B, and 1C show examples of items and information that may be processed and scanned in a manual distribution system. FIG. 1A shows an item 100a, such as a package, that may be a distribution item and may be processed by a scanning system. Machine readable information may be affixed to and/or printed on the item 100a. For example, the item 100a may have a barcode 151a, such as a Quick Response (QR) code 151a. Another barcode 155a, such as a four state barcode 155a (e.g., an Intelligent Mail® barcode) may also be affixed to the item 100a. The item 100a may also include machine readable text 160a that may be scanned and processed by the scanning system. As shown in FIG. 1A, the item 100a may be a package or other object of any shape or size.

FIG. 1B shows an example of another item, such as a mail piece 100b. Like the item 100a, a variety of types of machine readable information may be affixed to the mail piece 100b. For example, machine readable text 160b and a four state barcode 155b may be affixed and/or printed on the mail piece 100b. The mail piece 100b may further include a stamp 162b that may include a variety of type of information that may be scanned and processed to decode information from the stamp 162. For example, the stamp may include a barcode 150b or any other machine readable text. In some embodiments, the stamp may include an image 164b from which information associated with the image may be determined. The image 164b may also be affixed and/or printed to other portions of the mail piece 100b. The information extracted from the mail piece 100b or item 100a (FIG. 1A) may include a variety of different types of information associated with the item 100a, such as information associated with identifying the item 100a, tracking the item 100a, a destination of the item 100a, a source or sender of the item 100a, sorting data, routing information regarding the item 100a, and the like.

FIG. 1C shows examples of various different types of barcodes that may be affixed to and/or printed on item 100a or a mail piece 100b that may be scanned and decoded to extract information regarding the item 100a or mail piece 100b. For example, a barcode may be a data matrix barcode 151c that may be affixed to and/or printed on an item 100a. The barcode may also be a width modulated bar code 152c. In addition, other barcodes such as two state barcodes 153c and 154c (e.g., PLANET or POSTNET barcodes) may be used. A barcode may also be a four state barcode 155c, such as an Intelligent Mail® barcode, and affixed to and/or printed on an item 100a or mail piece 100b.

It should be appreciated that while the items 100a and 100b may be depicted and/or described herein as distribution items, the systems and methods described herein may be applicable to any item that may include machine readable information affixed to and/or printed thereon. In addition, the systems and methods described herein may be used in conjunction with any object that may be imaged and processed to extract information regarding the item. For examples, objects may include envelopes, cartons, flats, crates, bins, and the like. For ease of reference, items 100a and 100b may be referred to hereinafter as an item 100.

As described above, it may be desirable to have an automated way to scan and process an item 100 without intervention by an operator. For example, handheld scanners and/or processing systems may be cumbersome and difficult to manage. More particularly, it may be difficult for an operator to carry and scan an item 100 as well as position and or find areas on the item 100 to scan. As such, in some embodiments a scanning system may be employed relative to a scanning area such that an item 100 may be automatically scanned and processed when it passes within the scanning area. For example, a scanning system may employ an image capture device employed over a scanning area.

Figure 2:
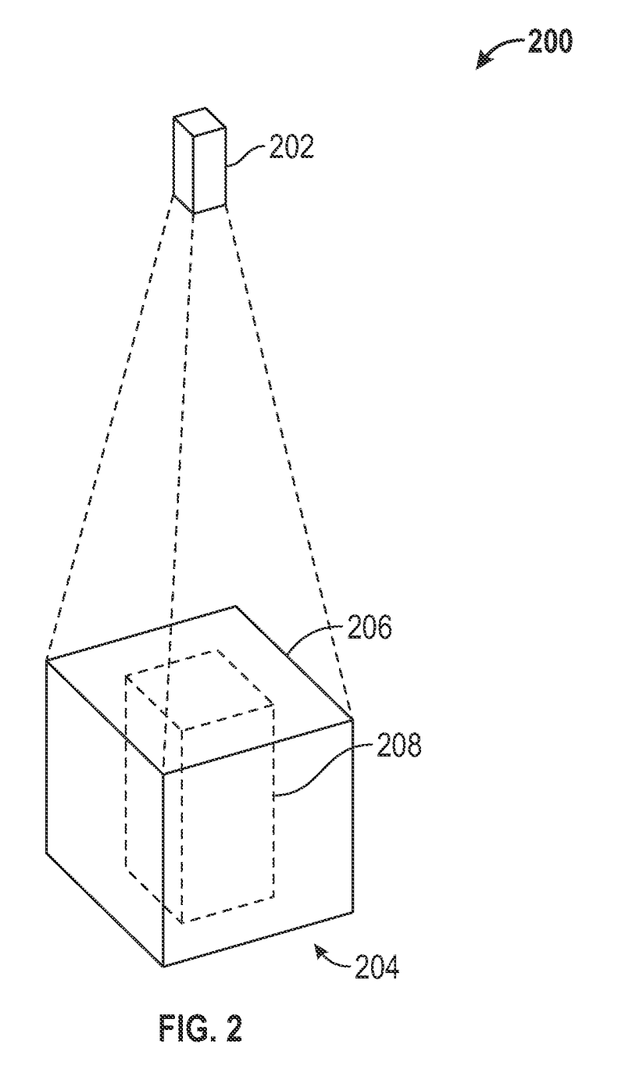
FIG. 2 is a perspective view of an image capture system for use in extracting machine readable information on an item placed within a scanning area.

FIG. 2 is a perspective view of an image capture system 200 for use in extracting machine readable information on an item 100 placed within a scanning area. For example, a scanning and processing system may employ the use of a two dimensional camera image capture system. Two-dimensional imaging systems may have high frame rates (e.g., 90 frames per second) and fast exposure times (e.g., 100 microseconds). These systems may be used in applications involving asynchronous movement without the need for motion specific information with respect to a target bar code or other machine readable text. For example, images may be captured at a speed such that at least one clear still image with all necessary information may be captured even as an item 100 is moving quickly through the system's scanning area.

The system 200 may include an image capture device 202 for capturing an image within a scanning area 104. The image capture device 202 may be for example, a camera (e.g., a digital camera), or any other device configured to capture images. In some embodiments, the image capture device 202 may include a two-dimensional array of image pixel sensors (not shown). The image sensors may be charge-coupled device (CCD) pixel sensors, complementary metal-oxide-semiconductor (CMOS) pixel sensors or the like. The image capture device 202 may be mounted overhead where an item 100 (not shown in FIG. 2), or more than one item 100, is moved through or placed on a surface within a field of view 206 of an overhead image capture device 202 for imaging/scanning as each item 100 is processed. This allows the item 100 to be sorted while capturing and processing machine readable data and other information from the item 100 in a hands free passive manner.

For example, an item 100 such as a distribution item (e.g., a mail piece) which may include barcodes, return addresses, destination addresses, and other information, may be placed in a field of view 206 of an overhead image capture device 202 for scanning as each item 100 is sorted. The field of view 206 of the image capture device 200 may include an area within a scanning area intended to capture machine readable information on an item 100 of differing heights and sizes. Captured images of an item 100 (or a portion of one or more items) may be processed using a controller (not shown) to decode barcode information, perform optical reading of information (e.g., return and destination addresses), and gather other information about the item 100 being sorted. The fixed mounted scanning system 200 may be placed over a conveyor belt or simply over a surface where an operator places each item within the field of view 206 of the image capture device 202. Alternatively, the item 100 may be carried by an operator and/or a machine under the image capture device 202 such that it is scanned and processed while moving. Although an item 100 such as a mail piece 100b is used as an example herein, the systems and methods described herein may be applicable for any system in which information on an item 100 may be extracted, such as warehouse items and the like.

The field of view 206 of the image capture device 202 may correspond to the visible area captured by image sensors of the image capture device 202. The field of the view 206 captured by the image capture device 202 may be constrained by a size of the two dimensional camera sensor array (e.g., number of row and column pixels on an image sensing chip) and the desired resolution of the image. The resolution may be measured in dots per inch (DPI). For example, when using an overhead image capture device 202, the desired resolution may be affected by the size of the camera sensor array and the height of the camera over an object being scanned. As the image capture device 202 is moved further away from an area of inspection, the field of view 206 may increase while the resolution may decrease. Some applications require an image capture device 202 with sufficiently high DPI to support optical character reading (e.g., 200 DPI or greater) as well as supporting barcode decoding.

As an example, in FIG. 2, the image capture device 202 may be placed thirty-six to forty-eight inches above a scanning area 204. In other embodiments, the image capture device 202 may be placed at other distances from the scanning area 204. According to this example, the resulting field of view 206 may define an approximate twelve inch by twelve inch area in which images may be captured for a target resolution. In other embodiments, the image capture area can be of other dimensions depending on, for example, the capabilities of the image capture device 202 or the distance of the image capture device 202 from the scanning area. The field of view 206 shown in FIG. 2, may be sufficient to allow the image capture device 202 to capture images with sufficiently high DPI for scanning an item 100 such as distribution items, which may include machine readable information such as barcodes, return addresses, destination addresses, and the like.

In order to accurately capture and process information such as return and destination addresses located on an item 100 (e.g., through optical character reading techniques, etc.), the item 100 may need to be placed such that return and destination addresses printed on the item 100 such as a mail piece 100b are positioned within a defined "trigger zone" 208 shown in FIG. 2. This may ensure that a captured image has all the data necessary to adequately extract the information from the item 100. The "trigger zone" 208 is within and may be significantly smaller than the field of view 206 of the image capture device. Given, for example, the field of view 206 defined by FIG. 2, operators may have difficulty placing an item correctly within or moving an item through the field of view 206 of the image capture device 202 such that information such as the return address and destination address of an item 100 are included within the trigger zone 208.

As such, it is desirable to increase the size of the field of view 206 of the image capture device 202 so as to allow operators to more quickly and easily place an item 100 while sorting and/or processing, such that captured images include all desired information to be automatically processed by the scanning system. A field of view 206 that is expanded or enlarged may allow for more efficient sorting operations and increased efficiency in capturing image data. However, placing an image capture device 202 at a further distance from a scanning area to increase the field of view 206 may be inadequate as, without further modification, the resolution of the resulting images may be reduced resulting in inaccurate image processing. For example, the resulting resolution may not be sufficient for optical character recognition desired by the system 200. Alternatively, expanding the field of view, while maintaining a desired resolution, may involve increasing the size of the sensor array of the image capture device 202. However, this may be difficult to achieve given that a larger image sensor array may be technologically infeasible or may unacceptably increase the cost of the image capture device 202. In addition, any other alterations to the scanning system resulting in increasing the field of view, without sacrificing resolution, should still enable an operator to sort and/or process an item 100 while automatically processing information from item 106 in a hands free passive manner.

According to embodiments described herein, systems and methods are provided for expanding the effective field of view of a system for capturing and processing image while avoiding, in some aspects, increasing the size of the image sensor array or decreasing the desired resolution.

Figure 3A:
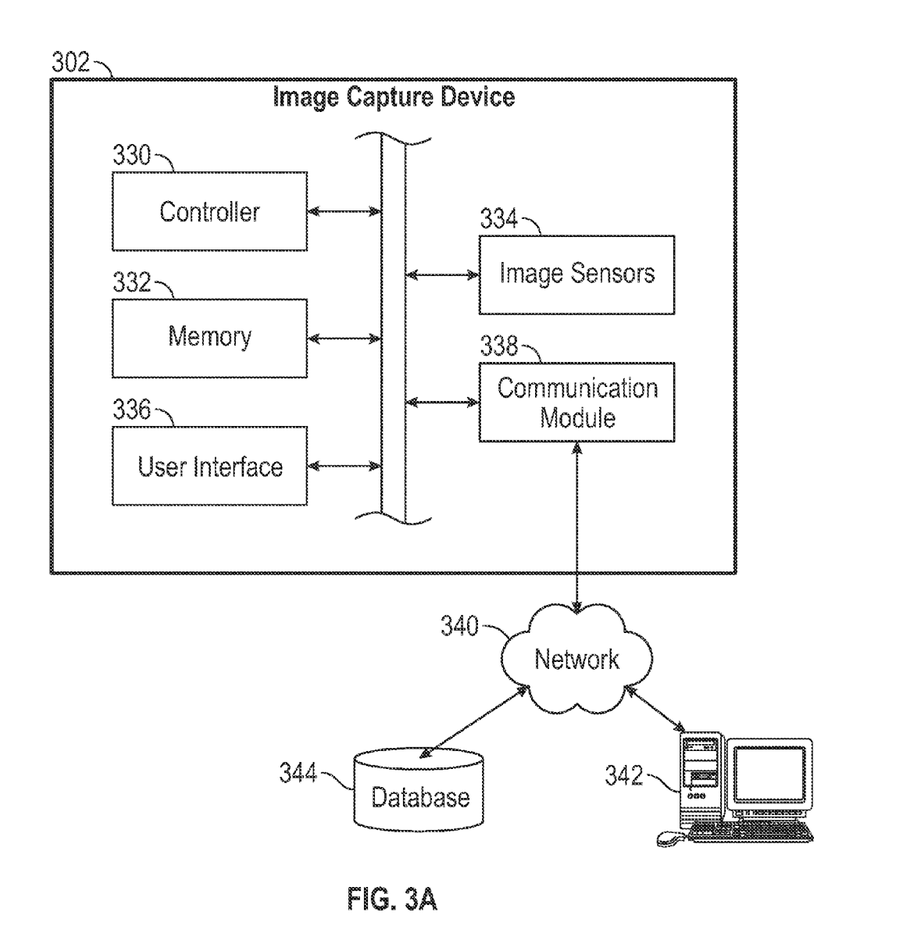
FIG. 3A is a functional block diagram of an image capture device, in accordance with embodiments described herein.

FIG. 3A is a functional block diagram of an image capture device 302, in accordance with embodiments described herein. FIG. 3A shows some of the components that may be used in the image capture device 302. The image capture device 302 of FIG. 3A, may be the image capture device 202 shown in FIG. 2 and may be an example of a device that may be configured to implement the various methods described herein. The image capture device 302 may include one or more image sensors 334. For example, the image sensors may be charge-coupled device (CCD) pixel sensors, complementary metal-oxide-semiconductor (CMOS) pixel sensors and the like. The image sensors 334 may form a two dimensional array of image sensors 334 and may be configured to convert light into digital signals that represent an image.

The image capture device 302 may include a controller 330 that may control operations of the image capture device 302. The controller 330 may also be referred to as a central processing unit (CPU) or just as a processor. The controller 330 may perform logical and arithmetic operations based on program instructions stored within a memory 332. Memory 332, which may include both read-only memory (ROM) and random access memory (RAM), provides instructions and data to the processor 330. A portion of the memory 206 may also include non-volatile random access memory (NVRAM). The instructions in the memory 206 may be executable to implement the methods described herein.

The controller 330 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The controller 330 may be configured to process image data obtained by the image sensors 334 to extract machine readable information on the images as described above. For example, the controller 330 may be configured to decode barcodes, perform optical character recognition, identify images, and the like. Memory 332 may be used to store instructions for processing image data using the controller 330.

The image capture device 302 may further include a communication module 338 that may include communication circuitry to allow transmission and reception of data between the image capture device 302 and a device external to the image capture device 302. The communication module 338 may be configured to send and receive data to or from the image capture device 302 via a network to a database 344 or another computer system 342. For example, machine readable information extracted from an item 100 scanned may be stored in the database 334 or managed and further processed by the computer system 342. For example, the computer system 342 may use the extracted information to allow further tracking and/or interaction with data extracted from a scanned item 100 such as for tracking, managing, and processing items being scanned. In addition, extracted information may be provided to a database 334 or computer system 342 as a reference to additional information stored regarding an item 100.

The image capture system 302 may further include a user interface 336 in some aspects. The user interface 336 may comprise a keypad, a microphone, a speaker, and/or a display. The user interface 336 may include any element or component that conveys information to a user of the image capture device 302 and/or receives input from the user. In some implementations, a remote computer system 342 may be used to control the operation of the image capture device 302 via the network 340 or other ways of communication. The image capture device 302 may also include a housing.

The various components of the image capture device 302 may be coupled together by a bus system 346. The bus system 346 may include a data bus, for example, as well as a power bus, a control signal bus, and a status signal bus in addition to the data bus. Those of skill in the art will appreciate the components of the image capture device 302 may be coupled together or accept or provide inputs to each other using some other mechanism.

Although a number of separate components are illustrated in FIG. 3A, those of skill in the art will recognize that one or more of the components may be combined or commonly implemented. For example, the controller 330 may be used to implement not only the functionality described above with respect to the controller 330, but also to implement the functionality described above with respect to the other components. Further, each of the components illustrated in FIG. 3A may be implemented using a plurality of separate elements. Furthermore the controller 330 may be used to implement any of the components, modules, circuits, or the like described below, or each may be implemented using a plurality of separate elements.

Figure 3B:
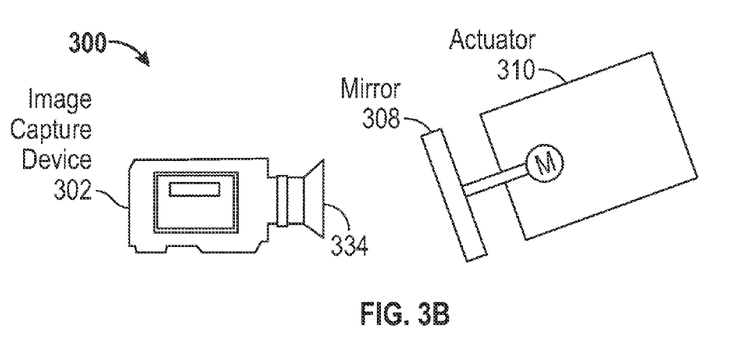
FIG. 3B is a functional block diagram of a system for capturing images including the image capture device of FIG. 3A and a movable mirror, in accordance with an embodiment described herein.

As described above, certain aspects of certain embodiments may be directed to expanding the effective field of view of a system for capturing and processing images. FIG. 3B is a functional block diagram of a system 300 for capturing images including the image capture device 302 of FIG. 3A and a movable mirror 308, in accordance with embodiments described herein. As shown in FIG. 3B, the system 300 may include a mirror 308 positioned relative to the input of the image sensors 334 such that light may be reflected off the mirror 308 and sensed by the image sensors 334 to capture image data reflected by the mirror 308. According to one embodiment, the mirror 308 may be continuously and selectively moved (e.g., rotated or tilted) according to some determined pattern of movement and some determined speed. As the mirror 308 changes positions, the reflected image captured by the image capture device 302 may vary based on the instantaneous position of the mirror 308. In this case, the position of the mirror 380 may define a slightly different reflected area. For example, the system 300 may include an actuator 310 (or any other appropriate electromechanical device and/or motor) physically connected to the mirror 310 for controllably moving the mirror 308 in some way. In some embodiments, the actuator 310 may be selectively controlled by a controller (not shown). For example, the controller 330 shown in FIG. 3A may be configured to send signals to control the actuator 310, or the actuator 310 may be connected to a dedicated controller, or the controller may be in a system external to the actuator 310 such as a computer system 342.

In operation, the controller 330 (FIG. 3) may be configured to capture at least one image while the mirror 308 is moving such that the field of view 206 defined by the at least one image changes based on an instantaneous position of the mirror 308. The controller 308 may then process the at least one image to extract machine readable information located on at least a portion of one or more items in the at least one image. Capturing a series of images as the mirror 308 moves may thus produce a series of distinct images, where the field of view 206 (FIG. 2) of each image may depend on the instantaneous position of the mirror. By processing/extracting machine readable information from each image (or a composite image), the combined field of view 206 defined by the sum of field of views of all of the images together may be larger than the field of view 206 for each individual image. As such, the field of view may be defined by the range of positions of the mirror 308 as it moves and the resulting reflected captured images. Accordingly, the range of movement of the mirror may effectively enlarge the field of view 206 that can be captured by the image capture device 302. In one aspect, no loss in resolution occurs, as the position and/or hardware configuration of the image capture device 302 is not altered.

As described above, there may be a variety of different ways the system 300 may be configured to effectively expand the field of view of the image capture device 302 using a movable mirror 308. As will be described below, a variety of different ways in which the mirror 308 may be moved may allow for expanding the field of view in different shapes and sizes according to the desired application.

Figure 4A:
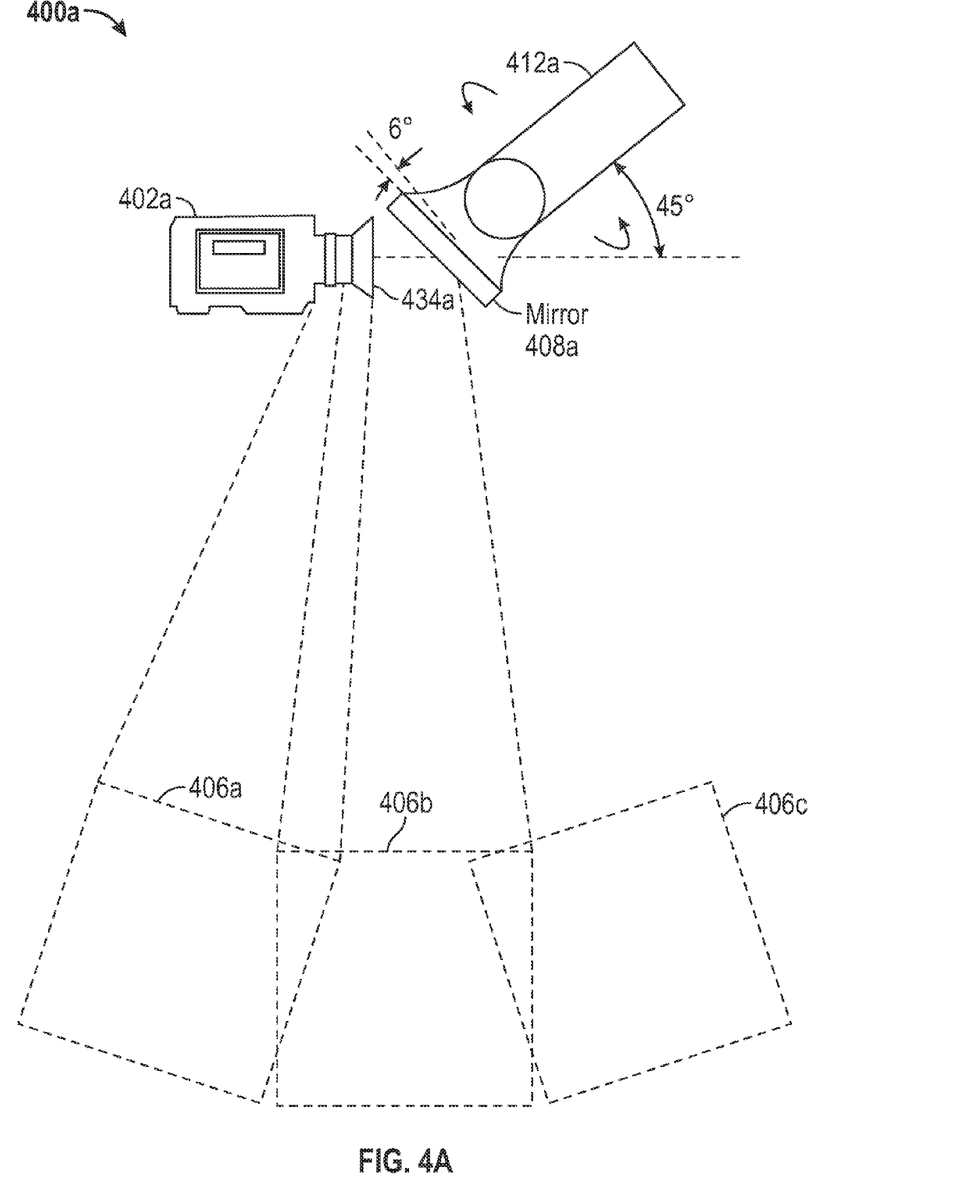
FIG. 4A is a side elevation view of a system for capturing images using a movable mirror for extracting machine readable information from items within a scanning area, in accordance with an embodiment described herein.

FIG. 4A is a side elevation view of a system 400 for capturing images using a movable mirror 408a for extracting machine readable information from items within a scanning area, in accordance with an embodiment described herein. The embodiments shown in FIG. 4A may be used to expand the effective field of view 406 of an image capture device 402a. A mirror 408a may be mounted to a rotatable structure 412a, for example, at a nominal forty-five degrees at the input of the image sensors 434a of the image capture device 402a. It should be appreciated that the mirror 408a may be mounted at a variety of angles (e.g., at least from 10 degrees to 80 degrees) according to the position of the image capture device 402a and the desired scanning area and field of view 406. Light is reflected off the mirror 408a and into the image sensors 434a of the image capture device 402a. The mirror 408a may be physically mounted to the rotatable structure 412a with a bias. For example, the mirror 408a may be affixed to the rotatable structure 412a at an angle from the rotatable structure 412a of more or less 6 degrees. This angle may be more or less depending on the application and desired field of view. An actuator 310 (FIG. 3) may be configured to continuously rotate the rotatable structure 412a while images are being captured by the image capture device 402a. In one aspect, as the rotatable structure 412a rotates, a 'wobble' may be seen as the biased (e.g., mounted at a fixed angle from the rotatable structure 412a) mirror 408a rotates.

The rotatable structure 412a may be rotated at a determined speed, for example at 2 Hz, to produce a sweep cycle of a half of a second. A frequency of two hertz may be adequate in some aspects for providing a fast reading response required for scanning images in a manual sorting operation. As the mirror 408a rotates, the field of view 406 as captured by the image capture device 402a will be determined by the instantaneous position of the mirror 408a. For example, as the mirror 408a is fixed at an angle with respect to the rotatable structure 412a, the portion of the mirror 408a that reflects into the image sensors 434a will change thus allowing images captured by the image capture device 402a to capture a different area under the mirror 408a. As a series of images are captured by the image capture device 402, the effective field of view of the images combined will correspond to the total visible area reflected off the mirror in each position. For example, the image capture device 402a may take 10 to 15 frames a second while the mirror is moving at 2 Hz to capture images at as the mirror 408a is at several different positions. The captured reflected images may correspond to a different area reflected into the mirror such that each image is different. Each of these images may be processed as they are captured to extract machine readable information. In one aspect, this may allow for sufficient time for objects moving within the expanded field of view to be imaged and processed.

This allows the combined field of view from all the images to create a circular pattern (e.g., circular pattern of images) within an area reflecting into the mirror 408a (e.g., underneath the mirror). As shown in FIG. 4A, as the mirror 408a rotates, three fields of view 406a, 406b, and 406c are shown which correspond to different positions of the mirror as it rotates. The combined areas defined by the fields of view 406a, 406b, and 406b may defined a expanded field of view as each image may be processed to extract machine readable information located in any of the fields of view 406a, 406b, and 406c.

Figure 4B:
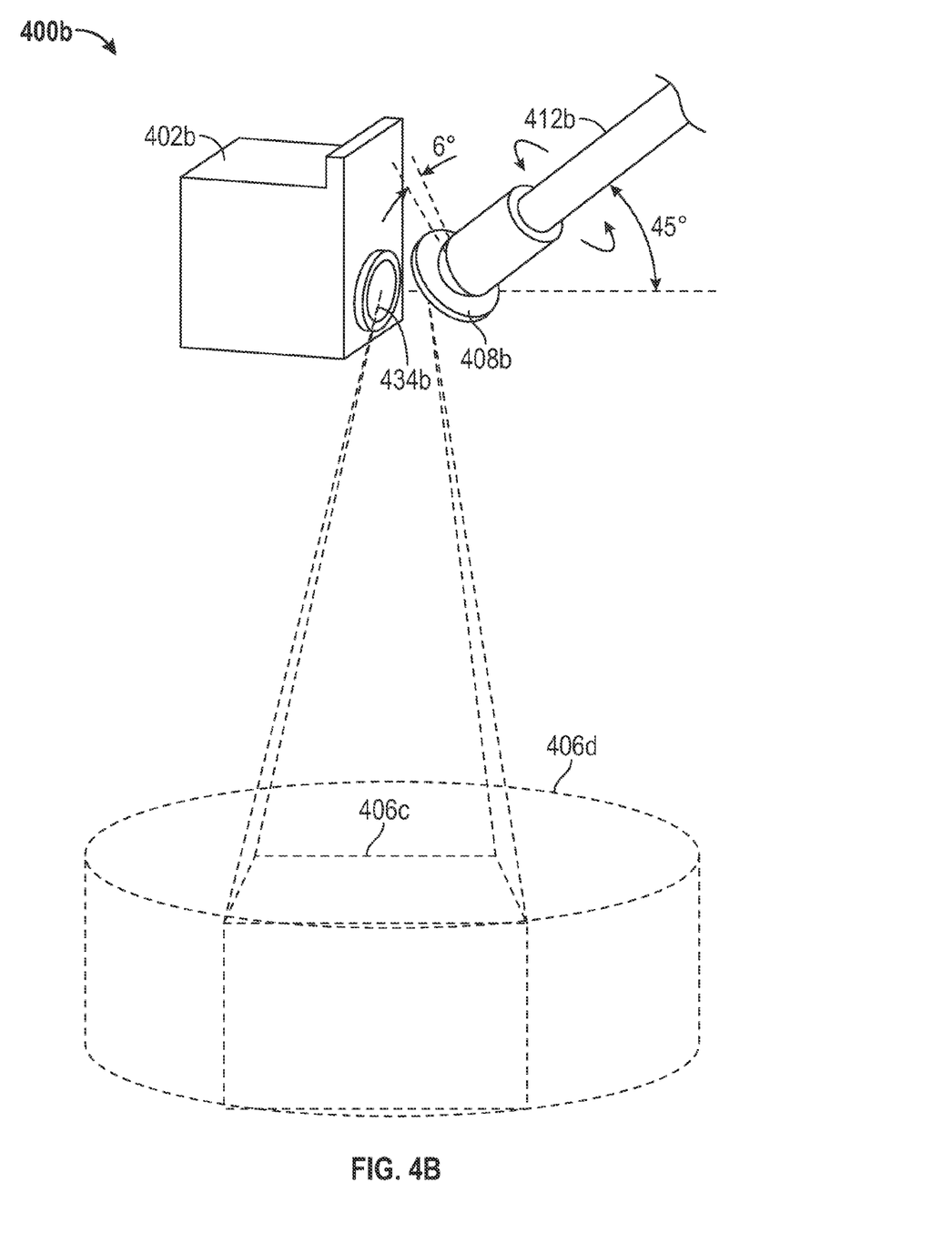
FIG. 4B is a side perspective view of the system of FIG. 4A for capturing and processing images using a movable mirror.

FIG. 4B is a side perspective view of the system 400b of FIG. 4A for capturing and processing images using a movable mirror 408b. As in FIG. 4A, the mirror 408a is angled from a rotatable structure 412b which is positioned such that light is reflected from the mirror 408b and into the image sensors 434b of the image capture device 402b. As is more easily shown in FIG. 4B, a field of view 406e capture by an image via the mirror 408b at an instantaneous position of the mirror 408b defines a three dimensional area. As the mirror moves and images are captured at each instantaneous position, the total field of view captured by the aggregate of all images may be shown by the three dimensional circular field of view 406b. This may greatly expand a circular area under the image capture device 402b in which information may be automatically extracted from items/objects passing underneath.

Figure 5A:
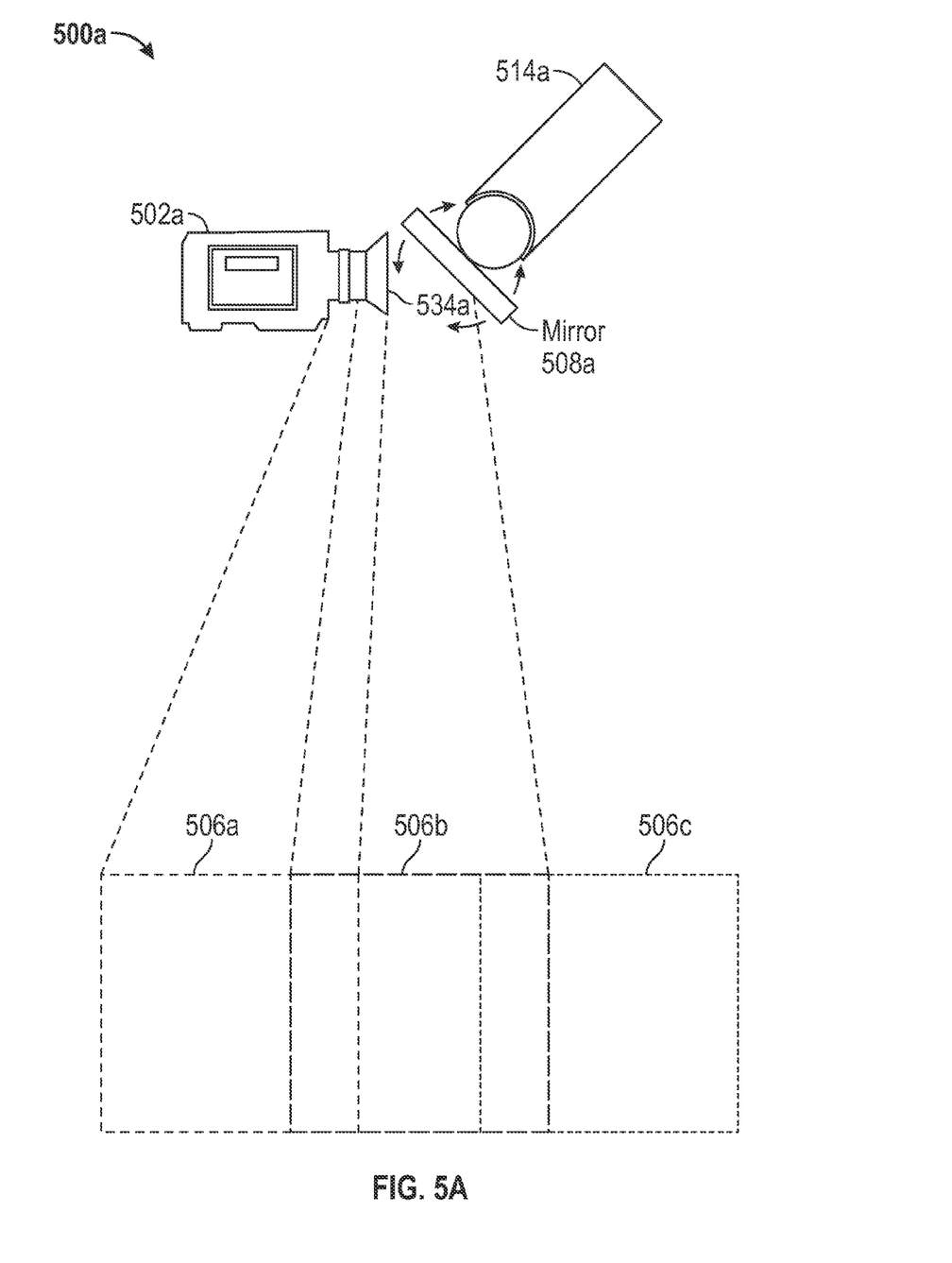
FIG. 5A is a side elevation view of a system for capturing images using a movable mirror for extracting machine readable information from items within a scanning area, in accordance with another embodiment described herein.

FIG. 5A is a side elevation view of a system 500 for capturing images using a movable mirror 508a for extracting machine readable information from items within a scanning area, in accordance with another embodiment described herein. As in FIG. 4A, the system 500 includes a rectangular or similarly shaped mirror 508a that is positioned relate to image sensors 534a of an image capture device 502a for capturing images reflected via the mirror 508a. In FIG. 5A, the mirror 508a is affixed to structure 514a that may be mounted at a nominal angle with respect to the input of the image sensors 534a. An actuator 310 (FIG. 3A) may be configured to cause the mirror 508a to linearly oscillate back and forth with respect to an axis (e.g., tilt back and forth or side to side). This may cause the field of view 506 to linearly sweep back and forth as shown by the combined fields of views 506a, 506b, and 506c defined by different positions of the mirror 508a. This provides for differently shaped combined fields of view as described above with respect to FIGS. 4A and 4B. It should be appreciated that the mirror 508a may be configured to linearly oscillate in any direction. For example, the mirror 508a may tilt with respect to any two opposing points on the mirror 508a (e.g., back and forth, laterally from side to side to create a side to side sweep, or at any angle) to create different expanded fields of view in different locations.

Figure 5B:
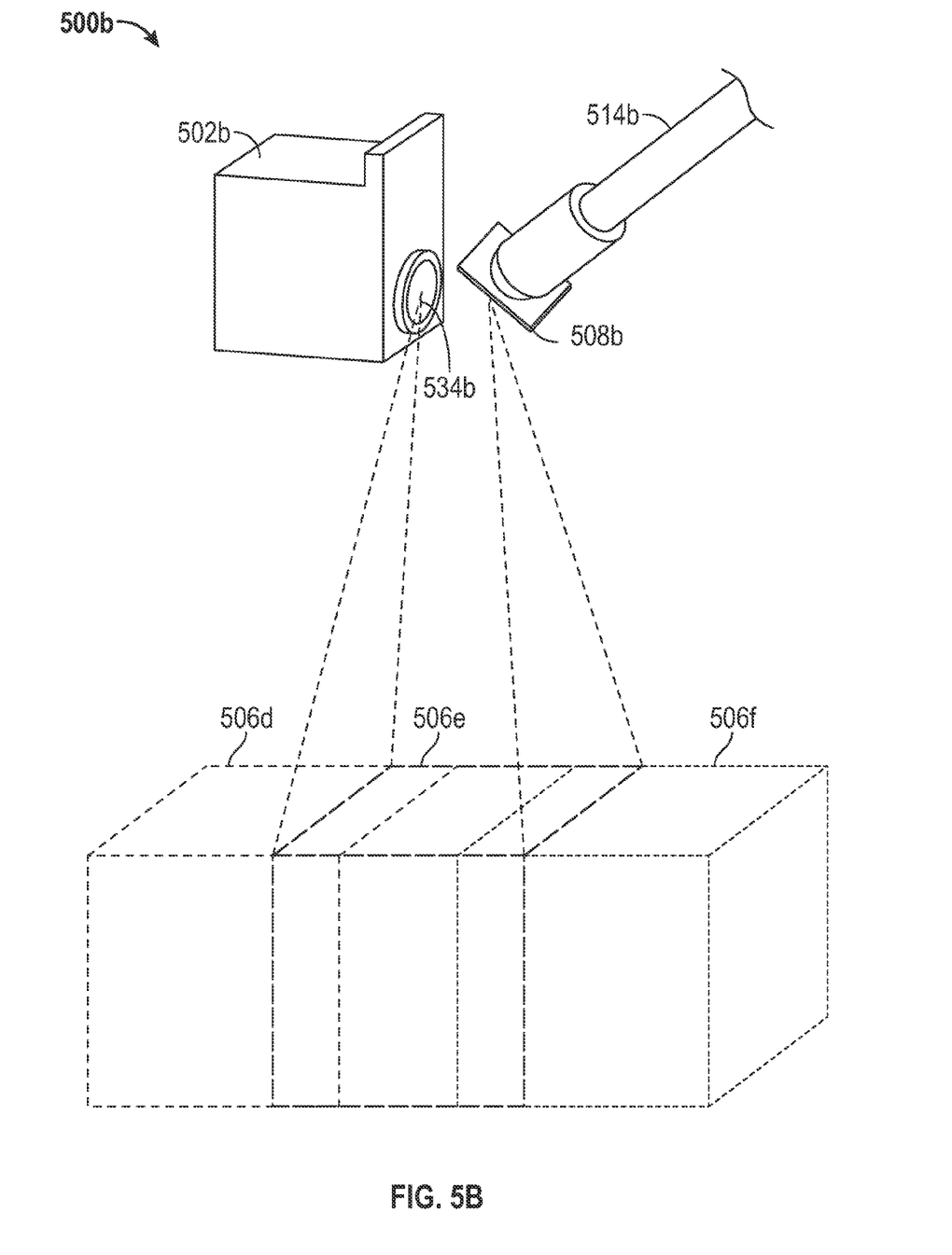
FIG. 5B is a side perspective view of the system of FIG. 5A for capturing and processing images using a movable mirror.

FIG. 5B is a side perspective view of the system 500 of FIG. 5A for capturing and processing images using a movable mirror 508b. As described above, the mirror 508b may tilt back and forth with respect to an axis to reflect different areas beneath the mirror into the image sensors 534b of the image capture device 502b. As shown, a three-dimensional area 506e is defined for one instantaneous position of the mirror 508b. The combined field of view defined by the fields of view 506d, 506e, and 506f for three different positions of the mirror 508b may form an expanded substantially rectangular three dimensional area for extracting information from items/objects placed within this area. As such, in contrast to FIGS. 4A and 4B, FIGS. 5A and 5B show how the configuration and pattern of movement may be changed to change the resulting expanded field of view for the scanning system. This may provide increased flexibility in configuring the scanning system at a low cost for different applications with different constraints on the field of view desired. It should be appreciated while FIGS. 4A and 4B and FIGS. 5A and 5B show two different patterns of movement, a variety of types of patterns of movement may be selected for defining different expanded fields of view according to the application and the desired field of view.

Figure 6A:
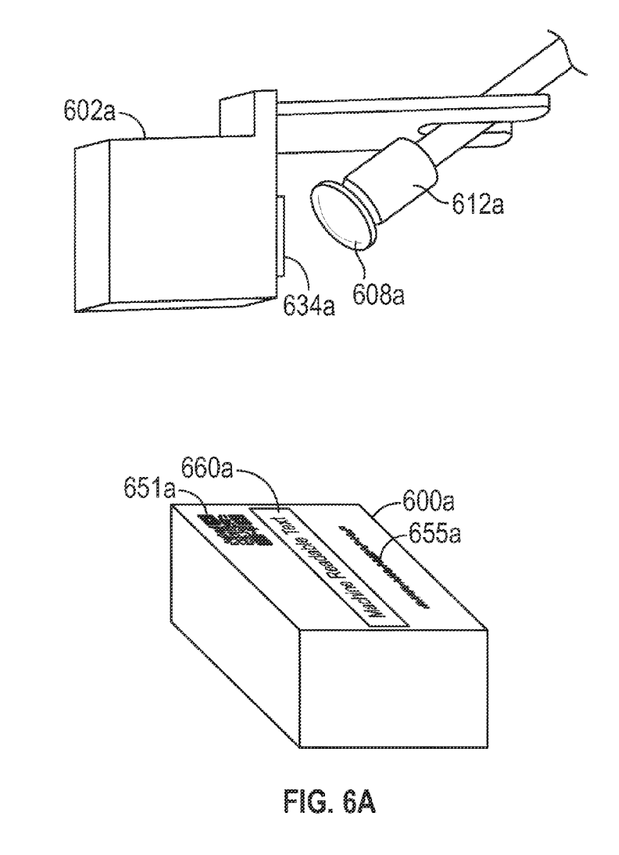
FIGS. 6A and 6B are perspective views of the system shown in FIGS. 4A and 4B respectively for extracting machine readable information from an item within a scanning area, in accordance with an embodiment described herein.
Figure 6B:
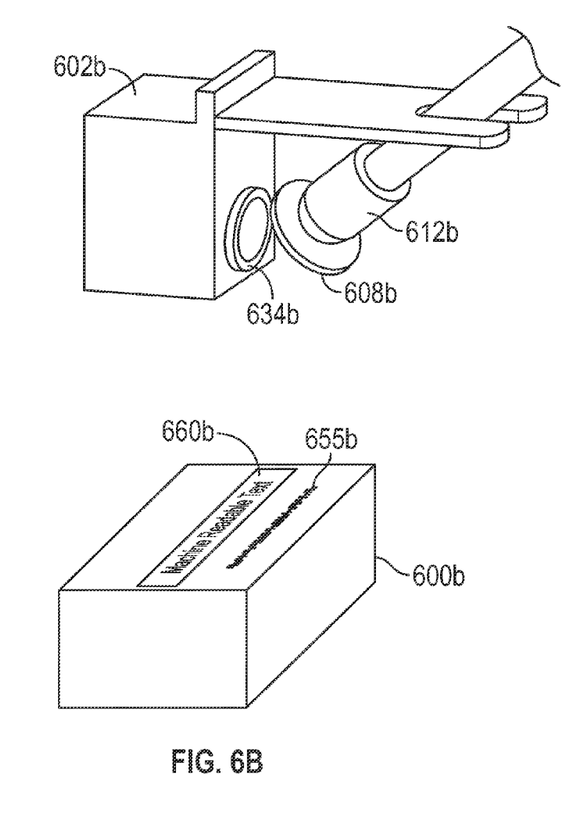

FIGS. 6A and 6B are additional perspective views of the system shown in FIGS. 4A and 4B respectively for extracting machine readable information from an item 600b within a scanning area, in accordance with an embodiment described herein. FIG. 6A shows a perspective view at an angle to show the mirror 608a as it reflects light into the image sensors 634a of the image capture device 602a. As shown, the mirror 608a is affixed to the surface of a rotatable structure 612a and may be attached at angle (i.e., biased) as described above with reference to FIG. 4A. A controller 330 (FIG. 3) may be configured to capture images as the mirror 608a rotates to extract machine readable information in several images of an item 600a below within an expanded field of view. As described above, the item 600a may include machine readable information such as barcode 651a and 655a as well as machine readable text 660 for which optical character recognition may be performed or other techniques for extracting information. FIG. 6B shows the image capture device 602b and mirror 608b at an alternative angle. The image capture device 602b and mirror 608b may be attached and mounted in a variety of different ways relative to a scanning area. The scanning area may over areas such as a table, a conveyor belt, an area where items are carried underneath, and the like.

Many variations to the above described embodiments are possible as will be appreciated by a person having ordinary skill in the art. For example, the speed at which a mirror is moved may be configured to be faster or slower, depending on the application and desired reading/scanning response. The speed may be dependent on the frame capture rate of the image capture device, the processing required to use combined image data, and other characteristics of the image scanning and processing system needed to achieve the appropriate reading/scanning response.

In addition, as noted above, various and more complicated scan/image patterns may also be achieved by changing the mirror 308 characteristics and/or motion mechanism. For example, in one embodiment, a semi-circular image pattern may be produced. The image pattern resulting from the chosen mirror movement pattern may also affect the processing required to use and combine image data from the series of images and may allow for adapting the shape and size of the target area in which distribution items may be placed. Furthermore, the shape, size and relative position of the mirror 308 with respect to the image capture device 302 may be configured for different applications. The shape, size and relative position of the mirror 308 may be used to change the visible area captured by a series of images and can be used to configure the desired resolution needed as well other parameters for achieving desired reading/scanning responses.

In addition, in some embodiments it may be necessary to synchronize the movement of the mirror 308 and/or capturing and processing of the images with the event of an item 100 or items moving within a scanning area. For example, the system 300 may be configured to detect when an item 100 is going to be scanned and automatically initiate the movement of the mirror 308 and capturing/processing of the images. For example, the system 300 may include one or more sensors (not shown) such as motion sensors that may detect that an item 100 needs to be scanned and initiate the process for capturing the images and causing the mirror 308 to start moving. Any other sensor that may detect the presence of an article within the scanning area may also be used. In another embodiment, the mirror 308 may be configured to continuously move regardless of the presence of the object, but the image capturing process may be selectively enabled upon detection of one or more items. In yet another embodiment there may be a manual input or switch that may be used by an operator to initiate the movement of the mirror 308 and/or the image capturing and processing process. A user interface may be provided to allow for controlling both the moving of the mirror and the capturing and processing of images. Other methods and/or sensors may also be used in accordance with the principles describes herein to synchronize the scanning process with the detection of items within the scanning area.

Figure 7:
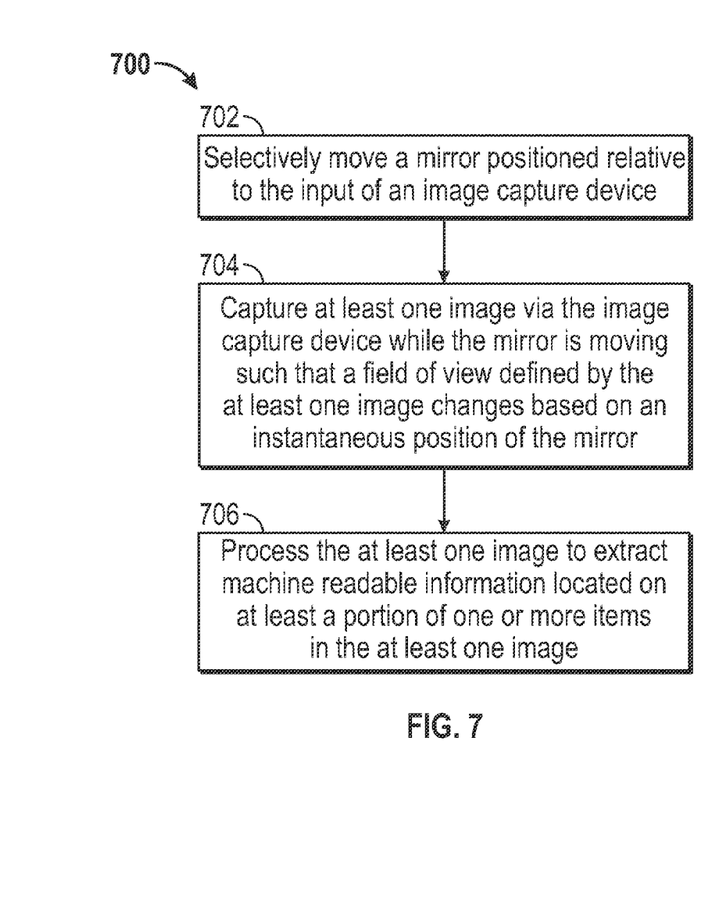
FIG. 7 is a flowchart illustrating an implementation of a method for expanding an effective field of view for use in a system for extracting machine readable information from an item within a scanning area, in accordance with an embodiment described herein.

FIG. 7 is a flowchart illustrating an implementation of a method 700 for expanding an effective field of view for use in a system for extracting machine readable information from an item within a scanning area, in accordance with an embodiment described herein. The method 700 may be used for capturing and processing images as described above. Although the method 700 is described below with respect to elements of the image capture device 302 (FIG. 3), those having ordinary skill in the art will appreciate that other components may be used to implement one or more of the steps described herein.

At block 702, a mirror 308 positioned relative to the input of an image capture device 302 is selectively moved. An actuator 310 may be configured to selectively move the mirror 308. At block 704, at least one image may be captured via an image capture device 302 while the mirror 308 is moving such that a field of view defined by the at least one image changes based on an instantaneous position of the mirror 308. A controller 330 of the image capture device 302 may be configured to capture the at least one image. At block 706, the at least one image is processed to extract machine readable information located on at least a portion of one or more items in the at least one image. The controller 330 may be configured to perform the processing.

It should be appreciated that there may be several ways of processing the series of images to extract machine readable information from items located in the images. While some examples are provided below, one skilled in the art will appreciate the variety of methods that may be used for processing images to decode and extract information found thereon.

Figure 8:
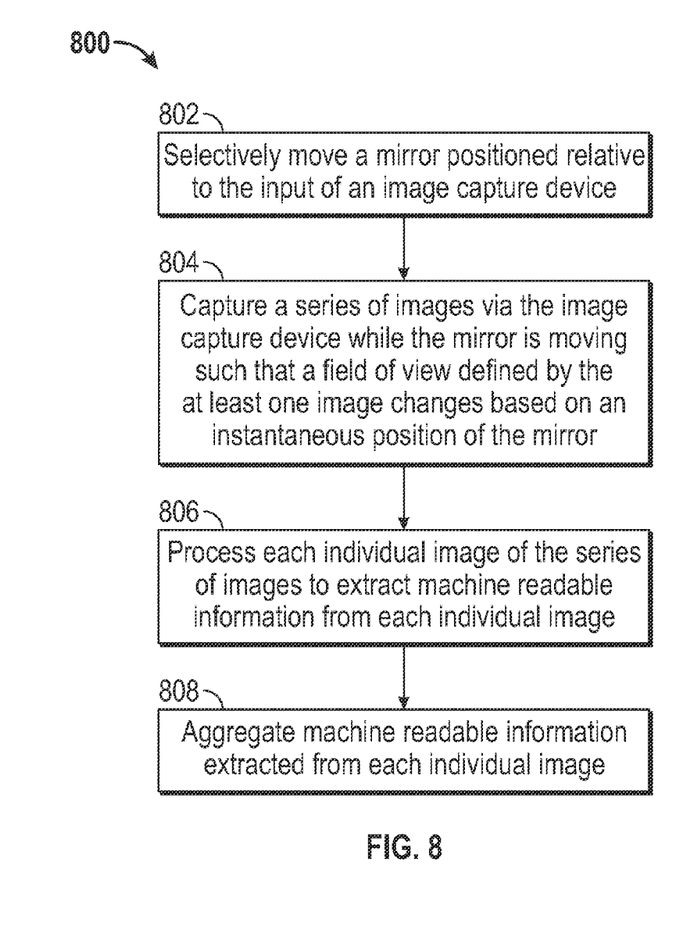
FIG. 8 is a flowchart illustrating an implementation of a method for capturing and processing images to extract machine readable information from an item located within a scanning area, in accordance with an embodiment described herein.

FIG. 8 is a flowchart illustrating an implementation of a method 800 for capturing and processing images to extract machine readable information from an item 100 located within a scanning area, in accordance with an embodiment described herein. As in FIG. 7, at block 802, a mirror 308 positioned relative to the input of an image capture device 302 is selectively moved. At block 804, a series of images are captured via the image capture device 302 while the mirror 308 is moving such that a field of view defined by the at least one image changes based on an instantaneous position of the mirror. At block 806, each individual image may be processed to extract machine readable information from each individual image. For example, each image may be analyzed individually to determine whether the image captures an item 100 with machine readable information affixed to and/or printed thereon. Once machine readable information has been detected, the information may be decoded as necessary from the information included in the image being processed. At block 808, the machine readable information extracted from each individual image is aggregated. This may include determining and eliminating redundant information, for example, if several images include the same piece of information. This may allow for continuous image capturing and processing as the mirror 308 moves to continuously scan and capture items/objects moving within the expanded field of view of the image capture system.

Figure 9:
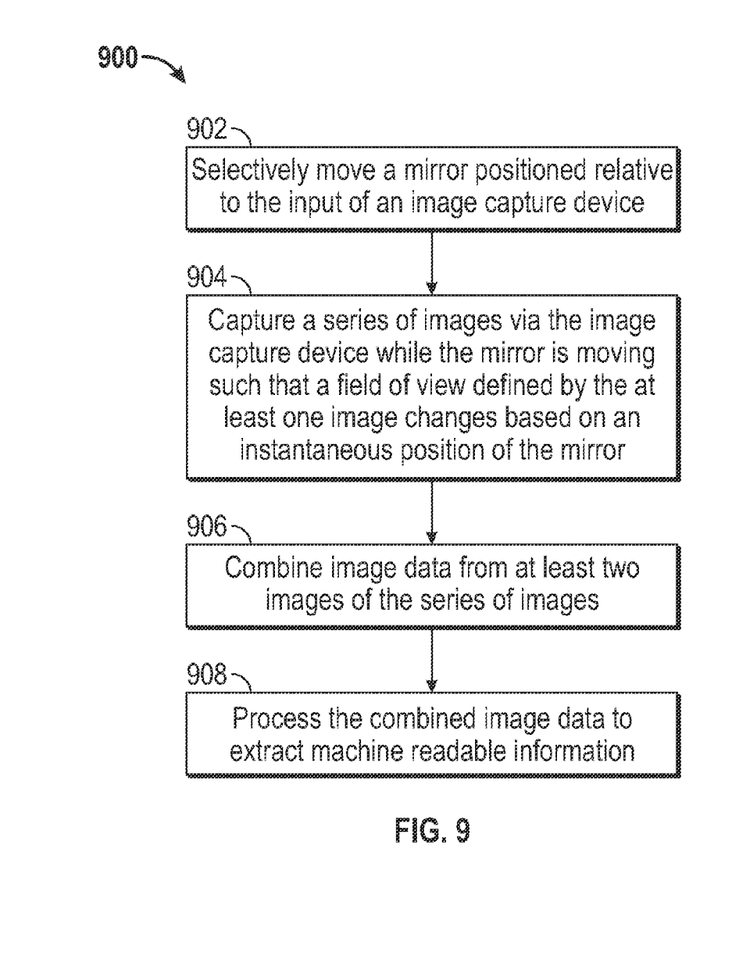
FIG. 9 is a flowchart illustrating an implementation of another method for capturing and processing images to extract machine readable information from an item located within a scanning area, in accordance with an embodiment described herein.

Alternatively or in combination with the method described with reference to FIG. 8, FIG. 9 is a flowchart illustrating an implementation of another method 900 for capturing and processing images to extract machine readable information from an item located within a scanning area, in accordance with an embodiment described herein. As in FIG. 7, at block 902, a mirror 308 positioned relative to the input of an image capture device 302 is selectively moved. At block 904, a series of images are captured via the image capture device 302 while the mirror 308 is moving such that a field of view defined by the at least one image changes based on an instantaneous position of the mirror. At block 906, image data from at least two images of the series of images is combined. For example, images may be stitched together to form an enlarged image with non-overlapping or non-overlapping data. At block 908, the combined image data is processed to extract machine readable information. This may allow for extracting information that may be only partially included on individual images, but that when combined together may allow for improved processing.

There may be many methods of extracting machine readable information from an item being scanned. For example, various image processing techniques may be used to identify target data in an image and extract and/or decode the target data. In addition, a variety of barcode decoding methods may be used according to the type and structure of the barcode. In addition, different methods of object segmentation and identification may further be used. Further, other optical character recognition techniques and like processes are additionally contemplated.

Figure 10:
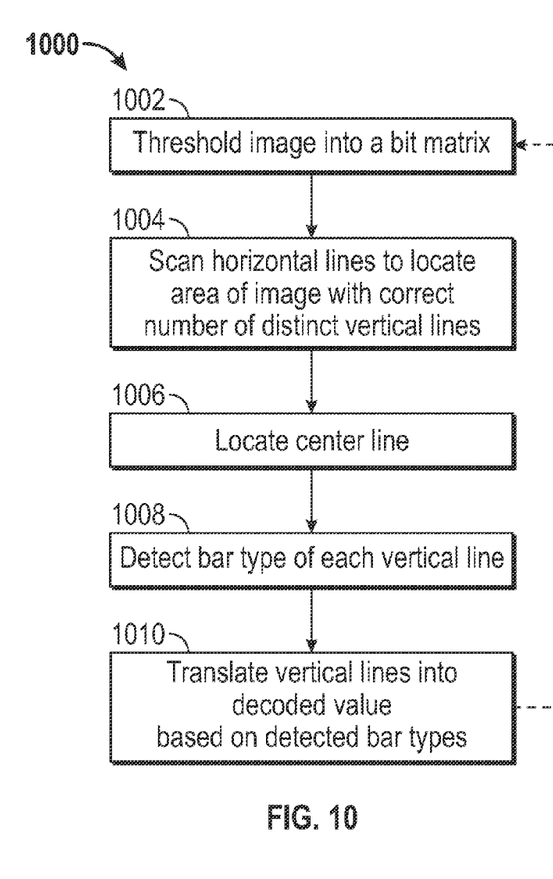
FIG. 10 is a flowchart illustrating an implementation of a method for processing an image to extract machine readable information in the form of a barcode, in accordance with an embodiment described herein.

As just one example of an image processing technique, FIG. 10 is a flowchart illustrating an implementation of a method 1000 for processing an image to extract machine readable information in the form of a barcode, in accordance with an embodiment described herein. Once an image has been captured, at block 1002, a controller 308 may be configured to threshold the captured image into a bit matrix. At block 1004, horizontal lines may be scanned to locate an area of image with correct number of distinct vertical lines. This may correspond to identifying a portion of an image in which a barcode is located. At block 1006, a center line may be located in order to provide a reference point for determining the type of each bar. At block 1008, bar types for each vertical line may be detected based on comparisons with expected bar types and using the center line. At block 1010, vertical lines may be translated into a decoded values based on detected bar types. The decoded value may be a numeric value, a string, or other alphanumeric value that may be stored. In one aspect, the decoded value may be used to access a database 344 to retrieve additional information about the barcode. Other processing may be further done based on the decoded value.

It should be appreciated that FIG. 10 shows just one possible example of a method for processing image data and other machine readable information. As such, numerous other methods may be used as would be appreciated by one skilled the art. For example, as described above, other methods employing optical character recognition, image recognition/detection, additional barcode image decoding, and the like may be used in accordance with the principles described herein.

As such, in accordance with embodiments described herein, a system 300 is provided that allows for enlarging the field of view of a scanning area while using a single image capture device 302. In one aspect, rather than specially modifying or upgrading an image capture device 302 such as a camera, a "stock" camera not specially adapted for higher resolution or increased image sensor array size may be used in the scanning system while still increasing the field of view. This may greatly reduce the cost of having a scanning system with an enlarged field of view while also maintaining an acceptable resolution for extracting machine readable information located on items passing through the enlarged field of view. In addition, according to the embodiments described herein, an image capture device 302 may not have to be modified or repositioned to change the shape of or the size of the field of view of the scanning system. Rather, the movement and/or shape and size of the mirror may be altered to produce different sweep patterns to alter the field of the view defined by images capture by the image capture device 302. This may additionally reduce the cost of having a reconfigurable system for different fields of view for applications and situations in which a scanning system may be employed.

It will be understood by those of skill in the art that numerous and various modifications can be made without departing from the spirit of the present invention. Therefore, it should be clearly understood that the forms of the invention are illustrative only and not intended to limit the scope of the invention. While the above detailed description has shown, described, and pointed out novel features as applied to various embodiments, it will be understood that various omissions, substitutions, and changes in the form and details of the device or process illustrated may be made by those skilled in the art without departing from the scope or spirit of the invention. As will be recognized, the embodiments described herein may be embodied within a form that does not provide all of the features and benefits set forth herein, as some features may be used or practiced separately from others.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, with reference to FIG. 3, means for reflecting light may include a mirror. Means for selectively moving may include a controller 308 or an actuator 310. Means for capturing at least one image may include an image capture device 302 and/or a controller 308 thereof. Means for processing may additionally include a controller 308. It should be appreciated that some of the image processing may occur external to the image capture device 308 by another connected processor or system. In this case, the controller 308 may be configured to communicate captured images to another processor for extracting machine readable information located on the images.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for capturing images, the apparatus comprising:
   an image capture device comprising one or more two-dimensional array image sensors;
   a mirror affixed to a rotatable structure, at an angle from the rotatable structure to reflect light toward the one or more two-dimensional array image sensors, wherein the rotatable structure is configured to be continuously rotated to create a circular pattern of images; and
   a controller configured to:
      capture a plurality of overlapping two-dimensional images of an item while the mirror is moving such that a field of view defined by the each of the plurality of images changes based on an instantaneous position of the mirror; and
      process the plurality of overlapping two-dimensional images to extract machine readable information located on at least a portion of the item in the plurality of overlapping two-dimensional images.

2. The apparatus of claim 1, wherein the image capture device and the mirror are configured to be affixed to obtain images from a scanning area.

3. The apparatus of claim 1, wherein the field of view defined by the plurality of overlapping two-dimensional images forms an expanded field of view as compared to a second field of view defined by any one individual image of the plurality of overlapping two-dimensional images.

4. The apparatus of claim 3, wherein the processor is configured to extract machine readable information from the at least a portion of the item within the expanded field of view.

5. The apparatus of claim 1, wherein the at least a portion of the item is located in one or more of the plurality of overlapping two-dimensional images.

6. The apparatus of claim 5, wherein the controller is configured to process the plurality of overlapping two-dimensional images by processing each individual image of the plurality of overlapping two-dimensional images and is further configured to aggregate information extracted from each individual image.

7. The apparatus of claim 5, wherein the controller is configured to process the plurality of overlapping two-dimensional images by combining image data from the plurality of overlapping two-dimensional images and is further configured to process the combined image data to extract machine readable information located on the at least a portion of the item.

8. The apparatus of claim 1, wherein the one or more items comprises a distribution item, and wherein the machine readable information comprises at least one of a barcode, a stamp, and text, and wherein the barcode comprises at least one of a one dimensional barcode, a two-dimensional barcode, a Quick Response code, and an Intelligent Barcode.

9. A method for capturing images, the method comprising:
   selectively moving a mirror affixed to a rotatable structure at an angle from the rotatable structure and positioned relative to the input of an image capture device, wherein selectively moving the mirror comprises continuously rotating the rotatable structure to create a circular pattern of images;
   capturing a plurality of overlapping two-dimensional images of an item via the image capture device while the mirror is moving such that a field of view defined by each of the plurality of overlapping two-dimensional images changes based on an instantaneous position of the mirror; and
   processing the plurality of overlapping two-dimensional images to extract machine readable information located on at least a portion of the item in the plurality of overlapping two-dimensional images.

10. The method of claim 9, wherein the image capture device and the mirror are configured to be affixed to obtain images from a scanning area.

11. The method of claim 9, wherein the field of view defined by the plurality of overlapping two-dimensional images forms an expanded field of view as compared to a second field of view defined by any one individual image of the plurality of overlapping two-dimensional images.

12. The method of claim 11, wherein the processor is configured to extract machine readable information from the at least a portion of the item within the expanded field of view.

13. The method of claim 9, wherein the at least a portion of the item is located in one or more of the plurality of overlapping two-dimensional images.

14. The method of claim 13, wherein processing the plurality of overlapping two-dimensional images comprises processing each individual image of the plurality of overlapping two-dimensional images and aggregating information extracted from each individual image.

15. The method of claim 13, wherein processing the plurality of overlapping two-dimensional images comprises combining image data from the plurality of overlapping two-dimensional images and processing the combined image data to extract machine readable information located on the at least a portion of the item.

16. The method of claim 9, wherein the one or more items comprises a distribution item, and wherein the machine readable information comprises at least one of a barcode, a stamp, and text, and wherein the barcode comprises at least one of a one dimensional barcode, a two-dimensional barcode, a Quick Response code, and an Intelligent Barcode.

17. An apparatus for capturing images, the apparatus comprising:
  means for reflecting light affixed to a rotatable structure at an angle from the rotatable structure;
  means for selectively moving the means for reflecting light by continuously rotating the rotatable structure to create a circular pattern of images;
  means for capturing a plurality of overlapping two-dimensional images using light reflected off the means for reflecting light while the means for reflecting light is moving such that a field of view defined by each of the plurality of overlapping two-dimensional images changes based on an instantaneous position of the means for reflecting light; and
  means for processing the plurality of overlapping two-dimensional images to extract machine readable information located on at least a portion of an item in the at least one image.

18. The apparatus of claim 17, wherein the means for capturing and the means for reflecting light are configured to be affixed to obtain images from a scanning area.

19. The apparatus of claim 17, wherein the field of view defined by the plurality of overlapping two-dimensional images forms an expanded field of view as compared to a second field of view defined by any one individual image of the plurality of overlapping two-dimensional images.

20. The apparatus of claim 19, wherein the means for processing further comprises means for processing the plurality of overlapping two-dimensional images to extract machine readable information from the at least a portion of the item within the expanded field of view.

21. The apparatus of claim 17, wherein the at least a portion of the item is located in one or more of the plurality of overlapping two-dimensional images.

22. The apparatus of claim 21, wherein the means for processing further comprises means for processing each individual image of the plurality of overlapping two-dimensional images and means for aggregating information extracted from each individual image.

23. The apparatus of claim 21, wherein the means for processing further comprises means for combining image data from the plurality of overlapping two-dimensional images and means for processing the combined image data to extract machine readable information located on the at least a portion of the item.

24. The apparatus of claim 17, wherein the one or more items comprises a distribution item, and wherein the machine readable information comprises at least one of a barcode, a stamp, and text, and wherein the barcode comprises at least one of a one dimensional barcode, a two-dimensional barcode, a Quick Response code, and an Intelligent Barcode.

25. An apparatus for capturing images comprising:
  a camera configured to capture a plurality of overlapping two-dimensional images, the first of the plurality of images defined by a first field view for a determined resolution;
  a mirror affixed to a rotatable structure at an angle from the rotatable structure, and wherein the rotatable structure is configured to be continuously rotated to create a circular pattern of images and is configured to be positioned at the input of the camera such that light is reflected from the mirror and into the camera; and
  a controller configured to capture a series of overlapping two-dimensional images via the camera while the mirror is moving such that a second field of view defined by the series of overlapping two-dimensional images is larger than the first field of view.

26. The apparatus of claim 25, wherein the camera and the mirror are configured to be affixed to obtain images from a scanning area.

27. The apparatus of claim 25, wherein the controller is further configured to extract machine readable information from at least a portion of an item within the second field of view.

28. The apparatus of claim 25, wherein the controller is further configured to process the series of overlapping two-dimensional images to extract machine readable information located on at least a portion of the item in the series of overlapping two-dimensional images.

29. The apparatus of claim 28, wherein the controller is further configured to process the series of overlapping two-dimensional images by processing each individual image of the series of overlapping two-dimensional images and further configured to aggregate information extracted from each individual image.

30. The apparatus of claim 28, wherein the controller is configured to process the series of overlapping two-dimensional images by combining image data from the series of images and is further configured to process the combined image data to extract machine readable information located on the at least a portion of the item.

* * * * *